(12) United States Patent
Ozaki

(10) Patent No.: US 9,120,524 B2
(45) Date of Patent: Sep. 1, 2015

(54) STRADDLE TYPE VEHICLE

(71) Applicant: HONDA MOTOR CO., LTD., Tokyo (JP)

(72) Inventor: Yoshinobu Ozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/061,966

(22) Filed: Oct. 24, 2013

(65) Prior Publication Data

US 2014/0131130 A1    May 15, 2014

(30) Foreign Application Priority Data

Nov. 13, 2012  (JP) .................................. 2012-249593

(51) Int. Cl.
| | |
|---|---|
| *F02M 35/04* | (2006.01) |
| *B62K 11/04* | (2006.01) |
| *B62J 35/00* | (2006.01) |
| *F02M 35/16* | (2006.01) |
| *F02M 35/02* | (2006.01) |

(52) U.S. Cl.
CPC ................. *B62K 11/04* (2013.01); *B62J 35/00* (2013.01); *F02M 35/048* (2013.01); *F02M 35/162* (2013.01); *F02M 35/02* (2013.01)

(58) Field of Classification Search
CPC ..... F02M 35/162; F02M 35/02; F02M 35/04; F02M 35/10013; F02M 35/044; F02M 35/048
USPC ............. 180/68.3, 68.1, 68.2, 69.4, 219, 225, 180/229, 291, 296, 301; 123/198 E
See application file for complete search history.

(56) References Cited

U.S. PATENT DOCUMENTS

| | | | | |
|---|---|---|---|---|
| 4,364,340 | A * | 12/1982 | Kimura ..................... | 123/184.34 |
| 4,509,613 | A * | 4/1985 | Yamaguchi ................... | 180/219 |
| 4,678,223 | A * | 7/1987 | Kishi et al. .................... | 296/78.1 |
| 5,560,446 | A * | 10/1996 | Onishi .......................... | 180/219 |
| 6,422,201 | B1 * | 7/2002 | Yamada et al. ................ | 123/336 |
| 7,032,563 | B2 * | 4/2006 | Nakagome et al. ........ | 123/198 E |
| 7,066,135 | B2 * | 6/2006 | Ishikawa et al. ........... | 123/198 E |
| 7,094,267 | B2 * | 8/2006 | Inayama ...................... | 55/385.3 |
| 7,100,575 | B2 * | 9/2006 | Kurayoshi et al. ............ | 123/470 |
| 7,270,207 | B2 * | 9/2007 | Idei et al. ....................... | 180/68.3 |
| 7,318,497 | B2 * | 1/2008 | Okunosono ................... | 181/227 |
| 7,353,899 | B2 * | 4/2008 | Abe et al. ...................... | 180/68.3 |
| 7,380,534 | B2 * | 6/2008 | Sekimoto .................. | 123/198 E |
| 7,380,624 | B2 * | 6/2008 | Momosaki .................... | 180/68.3 |

(Continued)

FOREIGN PATENT DOCUMENTS

JP          2006-213250 A      8/2006

*Primary Examiner* — Brodie Follman
*Assistant Examiner* — Emma K Frick
(74) *Attorney, Agent, or Firm* — Squire Patton Boggs (US) LLP

(57) ABSTRACT

A vehicle can include a pair of right and left main frames extending from a head pipe of a front portion to a rear direction. An engine is disposed below the main frames, a fuel tank is disposed above the main frames, and an air cleaner is disposed above the engine E and adjacent to the fuel tank. The air cleaner is disposed in the front direction side of the fuel tank, and a part of the air cleaner is disposed in the lower direction side of the fuel tank. An inner side portion disposed between the pair of right and left main frames and outer side portions disposed so as to bulge to the outer side in the width direction of the vehicle of the pair of right and left main frames are connected.

16 Claims, 7 Drawing Sheets

(56) References Cited

U.S. PATENT DOCUMENTS

| | | | |
|---|---|---|---|
| 7,849,947 B2* | 12/2010 | Morita | 180/219 |
| 7,942,226 B2* | 5/2011 | Nishizawa et al. | 180/219 |
| 7,967,092 B2* | 6/2011 | Fujimura | 180/68.3 |
| 8,105,406 B2* | 1/2012 | Nishizawa et al. | 55/385.3 |
| 8,146,693 B2* | 4/2012 | Oohashi et al. | 180/68.3 |
| 8,322,479 B2* | 12/2012 | Tani et al. | 180/219 |
| 8,413,754 B2* | 4/2013 | Matsuda et al. | 180/219 |
| 8,833,326 B2* | 9/2014 | Koyama | 123/184.57 |
| 2004/0060545 A1* | 4/2004 | Kurayoshi et al. | 123/472 |
| 2014/0174394 A1* | 6/2014 | Shimomura et al. | 123/184.21 |
| 2014/0209060 A1* | 7/2014 | Ozaki et al. | 123/319 |
| 2015/0041233 A1* | 2/2015 | Imai | 180/219 |

\* cited by examiner

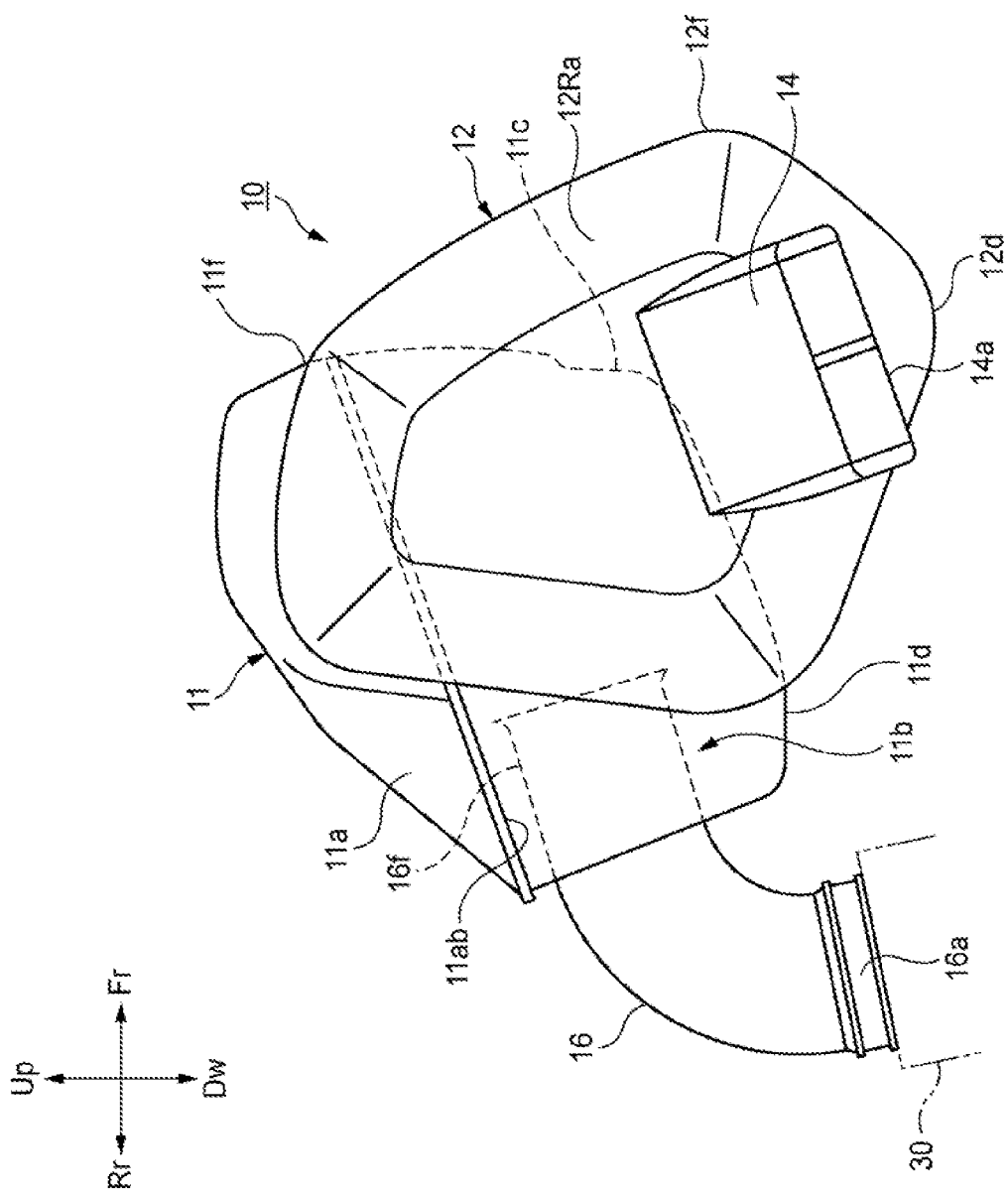

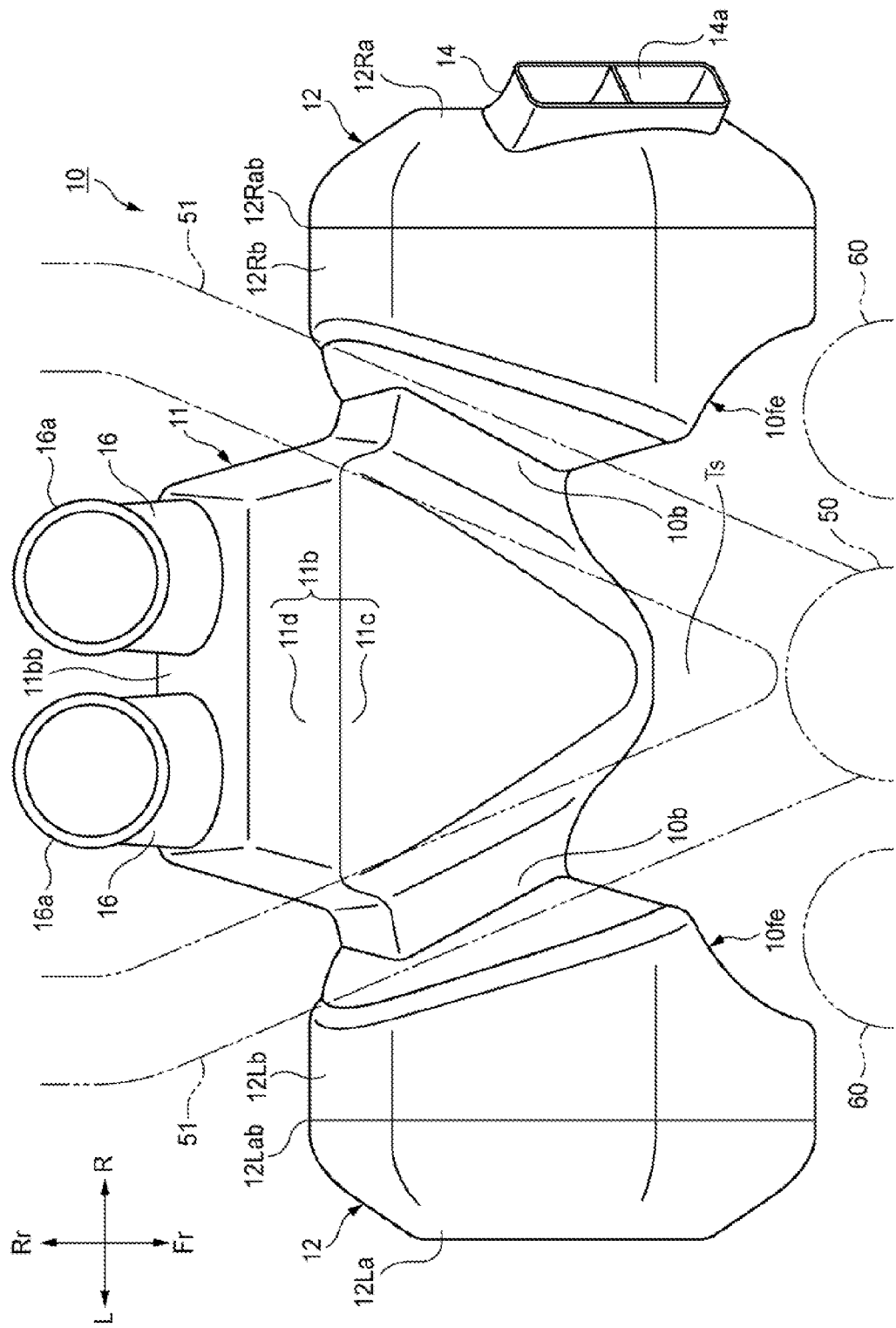

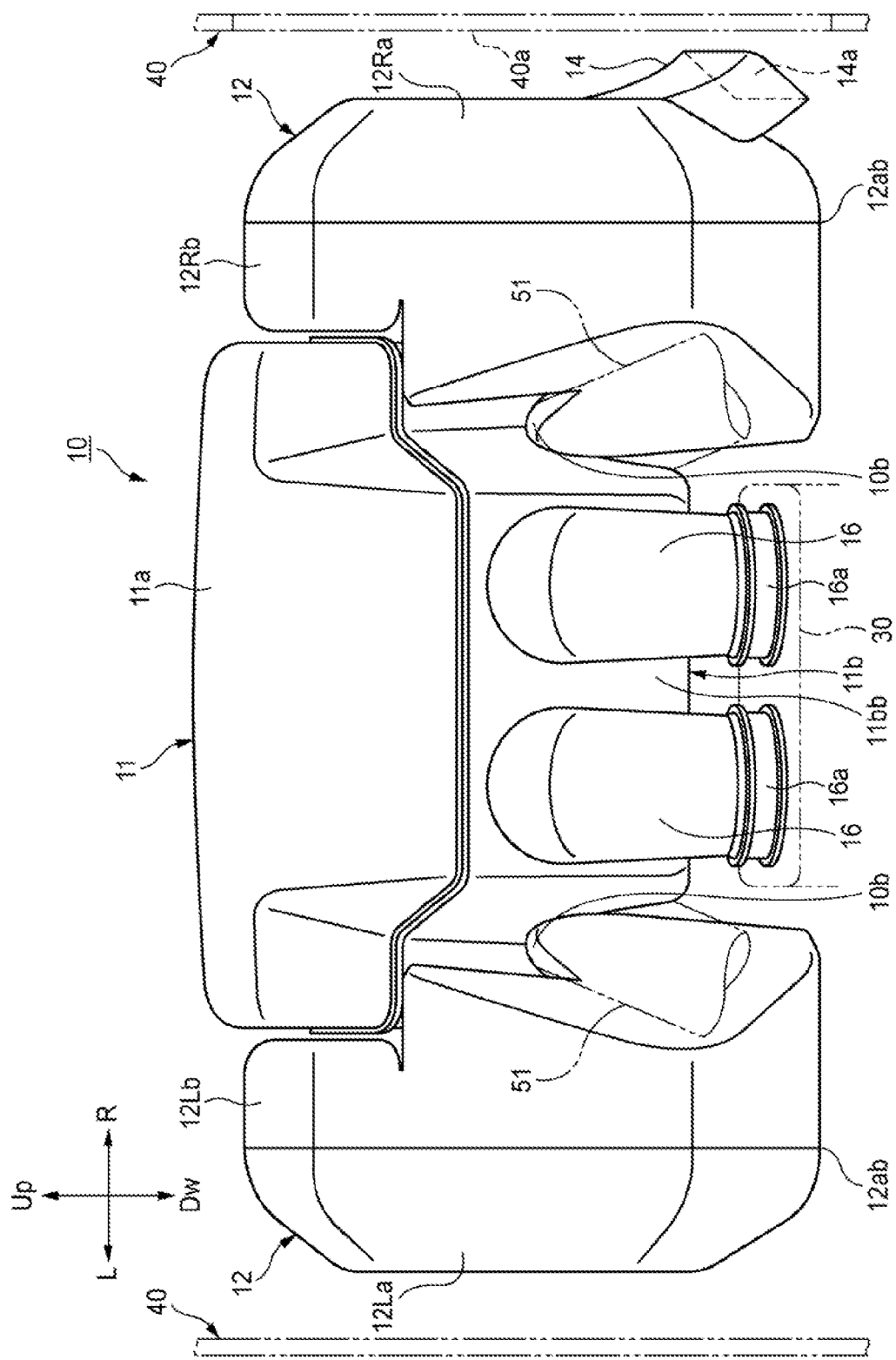

STRADDLE TYPE VEHICLE

BACKGROUND

1. Field

Embodiments of the present invention relate to a straddle type vehicle, such as a motorcycle, especially to the straddle type vehicle which can secure the capacity of an air cleaner.

2. Description of the Related Art

There is a widely known an ordinal straddle type vehicle in which an engine is mounted below pair of right and left main frames extending to the rear direction from a head pipe in a front portion of the vehicle body. A fuel tank is disposed above the main frames for example, see Japanese Laid-Open Patent Publication No. 2006-213250 (PATENT DOCUMENT 1). In the straddle type vehicle, the air cleaner is disposed in the upper direction of the engine and in the lower direction of the fuel tank, and between the pair of right and left main frames, in order to secure the intake air capacity of the air cleaner and to simultaneously shorten an intake passage.

SUMMARY

It is desirable in some cases to enlarge a fuel tank in the width direction of the vehicle in order to increase the capacity of the fuel tank in the case of the straddle type vehicle described in the above-mentioned PATENT DOCUMENT 1. However, the fuel tank has a large influence on the shape of the front portion of a seat on which a driver sits. Accordingly, enlargement of the fuel tank in the width direction of the vehicle may prevent the driver from taking a proper riding posture. Moreover, due to the fact that the air cleaner is disposed in the upper direction of the engine, in the lower direction of the fuel tank, and between the pair of right and left main frames, it is difficult to secure the capacity of the air cleaner.

The present invention has been made considering the above-mentioned circumstances, and aims to provide a straddle type vehicle such that the capacities of a fuel tank and an air cleaner are secured, and simultaneously the driver can maintain proper riding posture.

In certain embodiments, the invention can include straddle type vehicle having a pair of right and left main frames extending from a head pipe of a front portion of a vehicle to the rear direction of the vehicle. An engine is disposed below the main frames, and a fuel tank is disposed above the main frames. An air cleaner is disposed above the engine and adjacent to the fuel tank. The air cleaner is disposed in the front direction side of the fuel tank and a part of the air cleaner is disposed in the lower direction side of the fuel tank. An inner side portion is disposed between the pair of right and left main frames, and an outer side portion disposed so as to bulge to the outer side in the width direction of the vehicle of the pair of right and left main frames are connected.

In other embodiments, the outer side portion is formed such that a forefront portion in the front direction side of the vehicle bulges to the further forward direction side of the vehicle relative to the inner side portion.

In other embodiments, a pair of recessed portions recessed to the rear direction of the vehicle are adjacently formed in the right and left direction of the vehicle on a front end portion of the air cleaner in the upper view of the vehicle, and the recessed portions are disposed so as to face to a front fork holding a front wheel.

In other embodiments, at least one of the pair of right and left outer side portions houses an air cleaner element. An intake opening is provided on an outer side wall portion in the outer side in the width direction of the vehicle of the outer side portion housing the air cleaner element.

In other embodiments, the intake opening is opened to the lower direction and the front direction of the vehicle.

In other embodiments, an intake pipe sending the intake air from the air cleaner to a throttle body has an inside inserting tube portion extending to the inner direction of the inner side portion.

In other embodiments, the outer side wall portion of the outer side portion housing the air cleaner element is provided so as to be openable and closable.

In other embodiments, a cowl member covering at least the side directions of the outer side portions is provided. A cowl side portion facing to the outer side wall portion of the outer side portion housing the air cleaner element is provided so as to be openable and closable on the cowl member.

According to embodiments of the invention, the air cleaner has a structure in which a part of the air cleaner is disposed outside the main frame. Accordingly, the capacity of the air cleaner can be increased with less restriction on the vehicle body structure. Furthermore, due to the fact that most parts of the air cleaner are disposed in the front direction side of the fuel tank, the installation space for the fuel tank can be secured with less restriction on the fuel tank. Therefore, the contradictory problems including securement of the capacity of the air cleaner and securement of the capacity of the fuel tank can be solved simultaneously.

Moreover, there is no need to enlarge the fuel tank in the right and left direction of the vehicle for securing the capacity of the fuel tank, which can contribute to downsizing the fuel tank in the right and left direction of the vehicle, and which can contribute the driver on a rider seat consecutively disposed on the rear portion of the fuel tank to take better driving posture.

According to certain embodiments, due to the fact that the outer side portion of the air cleaner is formed so as to bulge to the further forward direction side of the vehicle relative to the inner side portion, the capacity of the air cleaner can be further secured by effectively using the right and left spaces of the front portion of the vehicle. Furthermore, securing the capacity of the fuel tank can be facilitated.

According to certain embodiments, due to the fact that the pair of right and left recessed portions are recessed to the rear direction of the vehicle on the front end portion of the air cleaner in the upper view of the vehicle, the air cleaner can be disposed on the forward position of the vehicle in a state that the air cleaner is adjacent to the front fork by the recessed portion. This can contribute to securing the capacity of the air cleaner, and simultaneously to securing the capacity of the fuel tank disposed on the rear direction side of the air cleaner. Accordingly, the fuel tank does not require the structure so as to largely bulge to the right and left direction of the vehicle, even if the capacity of the fuel tank is set larger. The fuel tank has a structure which is thin in the right and left direction and easy to ride. Therefore, this can contribute the driver to take better driving posture.

According to certain embodiments, due to the fact that the air cleaner element is provided in the outer side portion disposed outside the main frame, the air cleaner element becomes accessible, and the replacement of the air cleaner element and the maintenance operation can be facilitated. Moreover, due to the fact that an intake opening is provided on the outer side wall portion in the outer side of the vehicle of the outer side portion, the intake opening can reduce the structural influence on the peripheral component.

According to certain embodiments, the intake opening is opened to the lower direction and the front direction of the vehicle, which can facilitate to take the travelling wind into the intake opening and can prevent rainwater from entering.

According to certain embodiments, due to the fact that the intake pipe has an inside inserting tube portion inserted into the inner side portion, the intake pipe is formed so as to be long by using the space of the inner side portion. Accordingly, the low-speed torque of the engine can be increased.

According to certain embodiments, due to the fact that the outer side wall portion in the width direction of the vehicle is formed so as to be openable and closable on the outer side portion housing the air cleaner element, the air cleaner element becomes easily accessible by opening and closing the outer side wall portion. The replacement of the air cleaner element and the maintenance operation can therefore be facilitated.

According to certain embodiments, due to the fact that the cowl side portion facing to the outer side wall portion housing the air cleaner is provided so as to be openable and closable on the cowl member, the outer side wall portion can be opened by opening the cowl side portion, and the air cleaner element becomes accessible.

Accordingly, complicated operations such as overall detachment of the cowl member and detachment of the fuel tank can be omitted, and the replacement of the air cleaner element and the maintenance operation can be facilitated.

BRIEF DESCRIPTION OF THE DRAWINGS

FIG. 5 is a side view when the air cleaner provided on the motorcycle shown in FIG. 1 is viewed from the right side surface of the vehicle.

FIG. 6 is a bottom view when the air cleaner provided on the motorcycle shown in FIG. 1 is viewed from the lower side of the vehicle.

FIG. 7 is a back side view when the air cleaner provided on the motorcycle shown in FIG. 1 is viewed from the rear direction of the vehicle.

DETAILED DESCRIPTION

Figure 1:
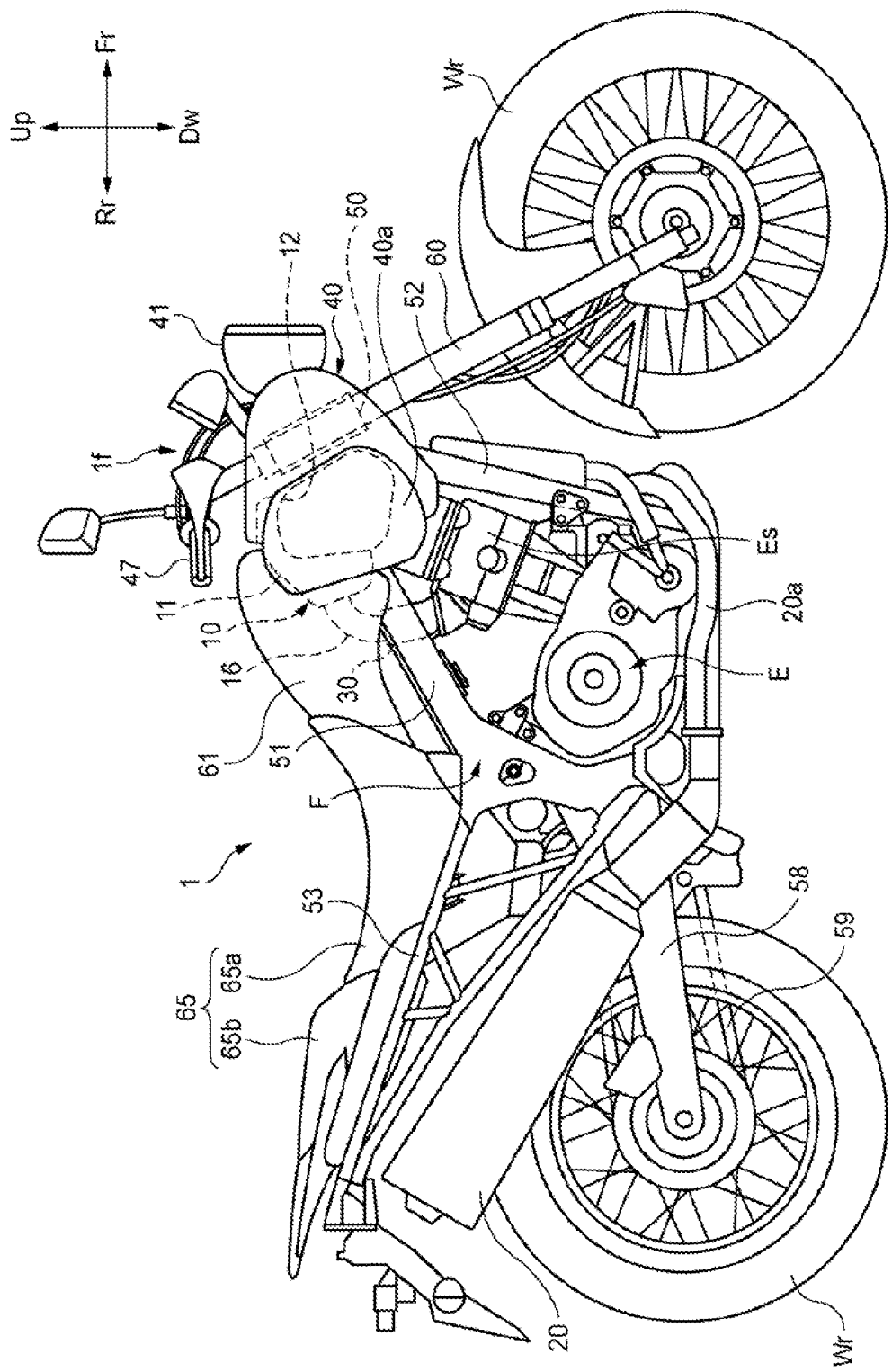
FIG. 1 is a right side view of a straddle-type vehicle, such as a motorcycle, having the air cleaner related to the present invention.

Hereinafter, the motorcycle which is a straddle type vehicle as one embodiment of the present invention will be explained in detail with reference to FIGS. 1 to 7. Moreover, the drawings should be seen following the directions of the signs, the directions relative to the travelling direction of the motorcycle are shown in the drawings, and the signs are shown as below. "Fr" shows the frontward, "Rr" shows the rearward, "Up" shows the upward, "Dw" shows the downward, "L" shows the left side, and "R" shows the right side.

Figure 2:
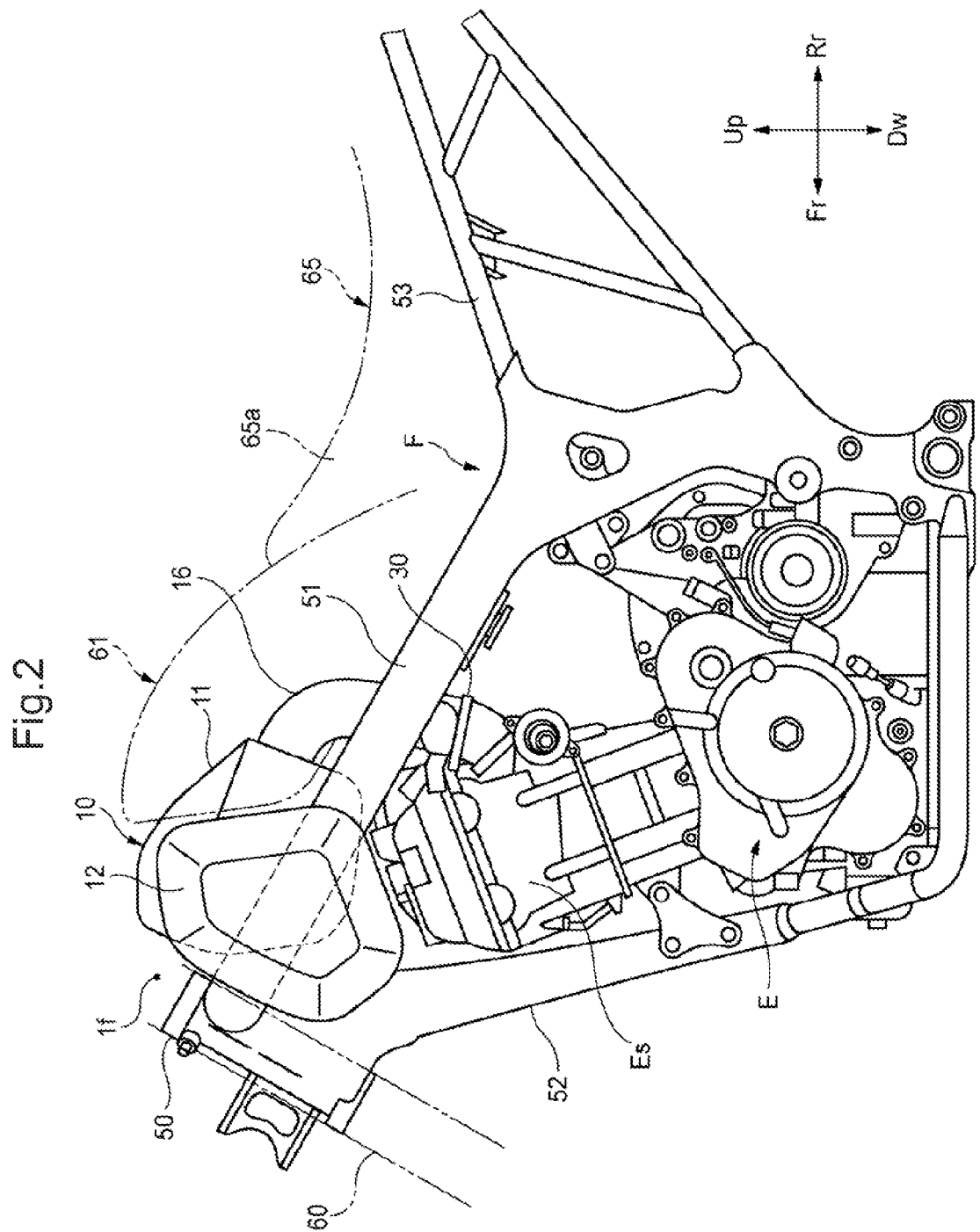
FIG. 2 is a side view when the vehicle body frame, the engine, and the air cleaner in the motorcycle shown in FIG. 1 are viewed from the left side of the vehicle.
Figure 3:
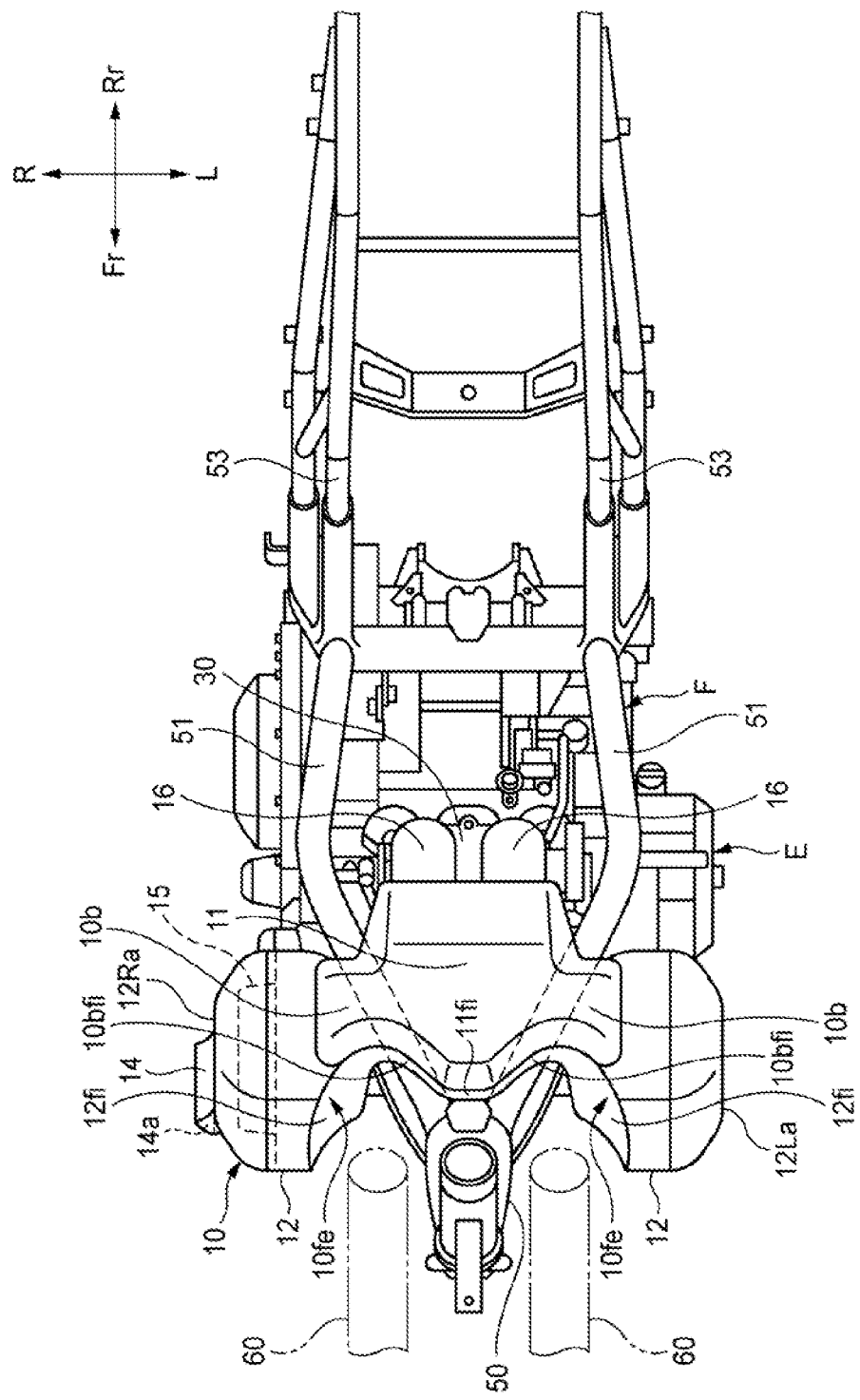
FIG. 3 is a plan view when the vehicle body frame, the engine, and the air cleaner in the motorcycle shown in FIG. 1 are viewed from the upper direction of the vehicle.

As shown in FIGS. 1 to 3, a motorcycle 1 in the present embodiment has a structure in which each component is installed on a vehicle body frame F as a framework. In other words, as for the vehicle body frame F, a head pipe 50 is provided on the front end portion of the vehicle, for example, a pair of right and left main frames 51, 51 are provided so as to be bifurcated into right and left from the head pipe 50, to be inclined downward to the rear direction, and to be extended to the rear direction. Furthermore, down tubes 52, 52 extending below the main frames 51, 51 to the lower direction and the rear direction of the vehicle body, and seat rails 53, 53 extending obliquely upward from the rear end portion of the main frames 51, 51 to the rear direction of the vehicle are provided. Engine E is disposed between the main frames 51, 51 and the down tubes 52, 52.

Furthermore, a front fork 60 holding a front wheel Wf is steerably supported on the head pipe 50, and a steering handle 47 is connected on the upper portion of the front fork 60. Moreover, a rear wheel Wr is rotatably held by a swing arm 58 swingably installed on the vehicle body frame F in the rear direction of the engine. Then, the drive force of the engine E is transmitted to a sprocket (not shown) through a chain 59.

In the present embodiment, the head pipe 50 and such as a head light 41 in front of the head pipe are provided on a front portion of the vehicle 1f. A cowl member 40 appropriately covers from the rear direction portion of the head light 41 to the vicinity of the front portion of the fuel tank 61. More specifically, as shown in FIG. 1, the cowl member 40 has the structure covering the area from the front direction side and both the right and left sides of the fuel tank 61 to the rear direction portion of the head light 41 and the side direction side of the upper portion of a cylinder portion Es in the lower direction side of the steering handle 47.

Furthermore, the fuel tank 61 is held in the upper direction of the main frames 51, 51, a rider seat 65 having a driver seat 65a for the driver behind the fuel tank 61, and a passenger seat 65b is provided on the seat rails 53, 53. For example, the engine E in the present embodiment can be a 1000cc twin-cylinder engine, and has an exhaust pipe 20a extending from the engine E to the rear direction of the vehicle. A muffler 20 can be connected to the rear end side of the exhaust pipe 20a, and extending to the rear direction and the upper direction approximately along the seat rail 53.

As shown in FIGS. 2 and 3, the air cleaner 10 is closely disposed to the head pipe 50 and to the front fork 60 which are provided on the front portion of the vehicle 1f, and apart of the air cleaner is disposed under the fuel tank 61. Furthermore, the air cleaner has the structure such that the three spaces are formed as below: an inner side portion 11 positioned between the main frames 51, 51, and outer side portions 12, 12 on both the right and left sides of the inner side portion. The inner side portion 11 is connected to the outer side portions 12, 12 through straddle connecting portions 10b, 10b formed such that the inner space between the inner side portion and the outer side portions straddles the main frames 51, 51.

As mentioned above, the air cleaner 10 can have the structure in which the part of the air cleaner is disposed outside the main frames 51, 51. It can be difficult to configure a structure such that the air cleaner is disposed only between the main frames 51, 51 to secure a suitable capacity. However, if the air cleaner is formed so as to enable to secure the additional capacity outside the main frames 51, 51, the capacity of the air cleaner can be easily increased with less restriction on the vehicle body structure. Furthermore, according to the structure such that most parts of the air cleaner 10 are disposed in the front direction side of the fuel tank 61, the installation space for the fuel tank can be easily secured with less restriction on the shape of the fuel tank.

Accordingly, securement of the capacity of the air cleaner 10 and securement of the capacity of the fuel tank 61 can be achieved simultaneously.

Furthermore, there is no need to enlarge the fuel tank 61 in the right and left direction of the vehicle for securing the capacity of the fuel tank, which can contribute to downsizing of the fuel tank 61 in the right and left direction of the vehicle. As apparently shown in the fact that the driver seat 65a is continuously provided on the rear portion of the fuel tank 61, the driver can easily grip the vehicle body his or her knees in a comfortable position, which can contribute the driver to take better driving posture.

As for the air cleaner 10 in the present embodiment, as shown in FIG. 6, the inner side portion 11 positioned on the central portion in the width direction of the vehicle is formed with an inner side bottom portion 11b having a triangle-shaped bottom portion 11c formed like a slightly pointed bow to the front direction side of the vehicle and a trapezoid-shaped bottom portion 11d in the rear direction side of the triangle-shaped bottom portion, and with an inner side 11d portion 11a (see FIGS. 4 and 5) closing the inner side bottom portion 11b from the upper direction side. Then, for example, the inner side portion 11 may be formed so as to be openable and closable at a combined surface portion 11ab as the border of the inner side bottom portion 11b and the inner side 11d portion 11a.

The triangle-shaped bottom portion 11c of the inner side portion 11 can be changeable so as to just fit inside an approximately triangle-shaped space Ts (see FIG. 6) in a plan view which is adjacent to the head pipe 50 between both the main frames 51, 51.

On the other hand, the outer side portions 12, 12 of the air cleaner 10 are positioned on the right and left outer sides of the vehicle of both the main frames 51, 51. The outer appearance has a symmetrically flattened and approximate pentagon shape when viewed from the side direction of the vehicle as shown in FIG. 5. The space formed between the outer side portions 12, 12 and the inner side portion 11 is connected by the straddle connecting portions 10b, 10b positioned above both the main frames 51, 51. Both the outer side portions 12, 12 are totally positioned on the forward direction of the vehicle relative to the inner side portion 11. Lowest end portions 12d, 12d of the outer side portions 12, 12 are positioned on the lower direction side of the vehicle relative to the inner side bottom portion 11b. In addition, forefront portions 12f, 12f are formed so as to be positioned on the forward direction side of the vehicle relative to the forefront portion 11f of the inner side portion 11.

As mentioned above, the outer side portions 12, 12 of the air cleaner 10 has a structure so as to bulge to the further forward direction side of the vehicle relative to the inner side portion 11.

Accordingly, both the side spaces of the front portion of the vehicle 1f can be effectively used and the capacity of the air cleaner 10 can be increased. According to this configuration, the fuel tank 61 can easily secure an appropriate capacity. As a result, the shape of the fuel tank can be configured so as to reduce the right and left width and the like, which can contribute the driver to take better driving posture.

As shown in FIG. 3, both the outer side portions 12, 12 have a structure such that outer side wall portions 12Ra, 12La of the outer side of the vehicle and inner side wall portions 12Rb, 12Lb of the inner side of the vehicle are combined and assembled at combined surface portions 12Rab, 12Lab, respectively.

Figure 4:
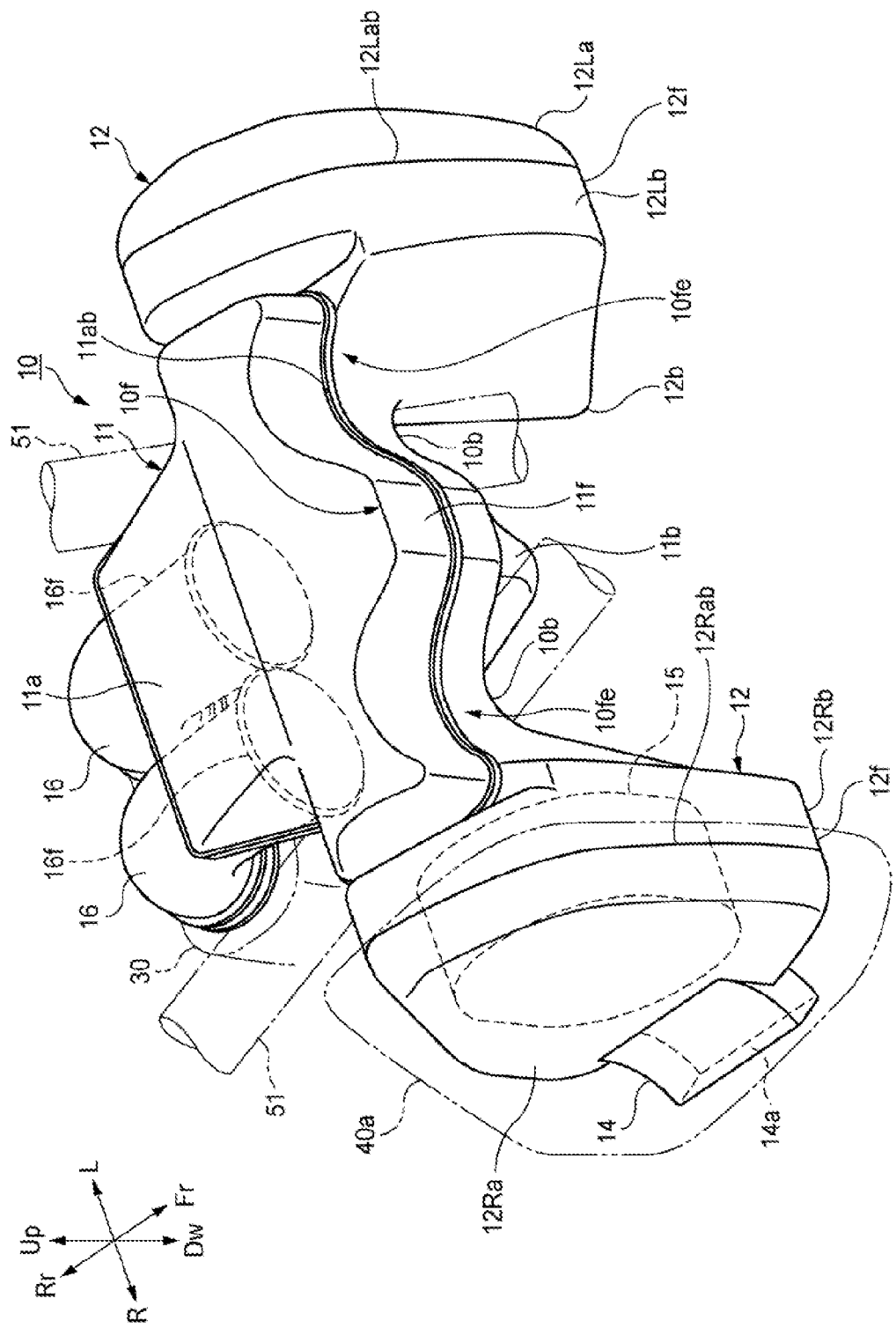
FIG. 4 is a perspective view of the air cleaner provided on the motorcycle shown in FIG. 1.

The air cleaner 10, as shown in FIGS. 3 and 4, the front end portion 10f is formed approximately in a figure of 3-shape in the plan view. That is, front direction inner side walls 12fi of both the outer side portions 12, 12, a front end wall 11fi of the inner side portion 11, and front end walls 10bfi, 10bfi of the straddle connecting portions 10b, 10b are in a continuously curved wall surface shape. A pair of recessed portions 10fe, 10fe recessed in an arc shape to the rear direction of the vehicle are adjacently formed in the right and left direction of the vehicle in the upper view of the vehicle. Then, the air cleaner 10 is disposed such that the recessed portions 10fe, 10fe to face the front fork 60 holding the front wheel Wf.

As mentioned above, the pair of right and left recessed portions 10fe, 10fe which are recessed to the rear direction of the vehicle are formed on the front end portion 10f of the air cleaner 10 in the upper view of the vehicle. Accordingly, the recessed portions 10fe, 10fe are facing to the front fork 60, and the whole of the air cleaner 10 can be adjacent to the front fork 60 and can be disposed on the forward position of the vehicle. As a result, this can contribute to securing the capacity of the air cleaner 10, and to securing the capacity of the fuel tank 61 disposed on the rear direction side of the air cleaner 10. Accordingly, even if the capacity of the fuel tank is set larger, the fuel tank 61 can be configured to avoid bulging in the right and left direction of the vehicle, and can therefore be thinner.

Moreover, an air cleaner element 15 is disposed in one of the outer side portions 12, 12, that is, in the right outer side portion 12 in the present embodiment. Namely, the right outer side portion 12 has a structure such that the inside of the right outer side portion is divided into a dirty chamber and a clean chamber due to the fact that the air cleaner element 15 is installed. Then, an intake portion 14 having an intake opening 14a to take in the outside air is provided so as to be connected to the dirty chamber on the outer side wall portion 12Ra positioned in the outer side of the vehicle.

As mentioned above, in the present embodiment, due to the fact that the air cleaner element 15 is provided in the outer side portion 12 disposed outside the main frame 51, the air cleaner element 15 becomes accessible. As a result, the replacement of the air cleaner element 15 and the maintenance operation can be facilitated. Moreover, due to the fact that the intake opening 14a is provided on the outer side wall portion 12Ra in the outer side of the vehicle of the outer side portion 12, the layout of the intake opening 14a can reduce the structural influence on the peripheral component.

As shown in FIGS. 6 and 7, in the present embodiment, the intake portion 14 is slightly bulged to the outer side of the vehicle from the outer side wall portion 12Ra and is extended to the lower direction. In addition, the intake opening 14a is opened to the lower direction, furthermore, is obliquely opened to the slightly front direction.

As mentioned above, in the present embodiment, the intake opening 14a is faced to the lower direction of the vehicle, which can prevent rainwater and the like from entering. The intake opening is opened to the front direction, which can facilitate to take the travelling wind into the intake opening 14a.

The right outer side portion 12 housing the air cleaner 10 has the structure in which the outer side wall portion 12Ra of the right outer side portion is openable and closable. Here, the structure which is openable and closable is not limited to the installation structure of the outer side wall portion 12Ra, however, for example, it may be a removable structure (detachable structure) in which the outer side wall portion 12Ra appropriately has engaging hooks in the combined surface portion 12Rab, and an open and close structure which has open and close hinges like a door on the combined surface portion 12Rab and in the vicinity of the combined surface portion.

As mentioned above, due to the fact that the outer side wall portion 12Ra in the width direction of the vehicle is formed so as to be openable and closable on the outer side portion 12 housing the air cleaner element 15, the air cleaner element 15 becomes accessible. Therefore, the replacement of the air cleaner element 15 and the maintenance operation can be facilitated.

As mentioned above, in the present embodiment, due to the fact that the cowl member 40 covering the upper direction side and the side direction side of the outer side portions 12, 12 is provided, the air cleaner 10 is protected and simultaneously cannot be seen from the outside. However, the portion covering the outer side wall portion 12Ra of the outer side portion 12, which houses the air cleaner element 15, is formed as the cowl side portion 40a which is partially openable and closable. As shown in FIG. 1, the cowl side portion 40a in the right side of the vehicle is formed in a size of an area including the edge portion abutted to the front end portion of the fuel tank 61 to the outer side wall portion 12Ra. In the present embodiment, an open and close structure like the cowl side portion 40a is not provided on the left side of the vehicle.

The open and close structure of the cowl side portion 40a has not been specifically limited. However, for example, it may be a structure in which the cowl side portion 40a is detached (detachable structure) or an open and close structure having hinges appropriately.

As mentioned above, the cowl member 40 has a structure in which the cowl side portion 40a is openable and closable corresponding to the position where the air cleaner element 15 is installed. Accordingly, the air cleaner element 15 becomes accessible without complicated operations such as the overall detachment of the cowl member 40 and the detachment of the fuel tank 61, and the replacement of the air cleaner element 15 and the maintenance operation can be highly facilitated.

Moreover, in the present embodiment, two intake pipes 16, 16 sending the intake air from the air cleaner 10 to the throttle body 30 are provided. The intake pipes 16, 16 are connected to a rear end wall 11bb (see FIG. 7) of the inner side bottom portion 11b of the inner side portion 11. The lower end portions 16a, 16a in the lower side are connected to the throttle body 30. Inside inserting tube portions 16f, 16f (see FIG. 4) are provided such that the tip portions in the upper side are inserted into the inner direction side of the inner side portion 11.

As mentioned above, due to the fact that the intake pipes 16, 16 have the inside inserting tube portions 16f, 16f inserted into the inner side portion 11, the intake pipes 16, 16 are formed so as to be long by using the space of the inner side portion 11. Accordingly, the low-speed torque of the engine can be increased.

As mentioned above, various embodiments according to the present invention has been explained. However, the present invention is not limited to these embodiments. For example, as the above-mentioned embodiments, the outer side portions 12, 12 are formed so as to be provided on both the right and left of the main frames 51, 51. However, the outer side portion may be formed so as to be provided on any one of right and left of the main frames. Furthermore, as for the structure connecting the inner side portion 11 and the outer side portion 12, it may be not only the structure that a straddle connecting portion 10b passing above the main frame 51 as mentioned above, but also a connecting structure passing below the main frame 51 and a structure passing both above and below the main frame 51. Moreover, the recessed portion 10fe recessed is formed in an arc shape in the upper view of the vehicle in the above-mentioned embodiment. However, shapes other than an arc shape are possible.

In the above-mentioned embodiment, the air cleaner element 15 is provided in only one of the outer side portions 12. However, the air cleaner elements may be provided in both the right and left of the outer side portions 12, 12. The shapes of the inner side portion 11 and the outer side portions 12, 12 of the air cleaner 10 are variously changeable.

Moreover, the right and left of shapes and sizes of the outer side portions 12, 12 are not necessarily the same and can be appropriately changeable as necessary.

In addition, the engine E is a two-cylinder type in the above-mentioned embodiment. However, the present invention is not limited to this, and the engine may be any one of a single cylinder or a four-cylinder and the like. Especially, the present invention can be used with engines of various displacements, including large displacement engines which may have large outer dimensions.

In the above-mentioned embodiment, about two-wheeled motorcycle has been explained. However, the present invention is not limited to this, and can be applied to other straddle type vehicles in addition to three-wheeled vehicles or four-wheeled vehicles.

DESCRIPTION OF REFERENCE NUMERALS 1 motorcycle (straddle type vehicle)
1f front portion of the vehicle
10 air cleaner
10b straddle connecting portion
10f front end portion of the air cleaner
10fe recessed portion
11 inner side portion
12 outer side portion
12f forefront portion
12Ra outer side wall portion
14a intake opening
15 air cleaner element
16 intake pipe
16f inside inserting tube portion
30 throttle body
40 cowl member
40a cowl side portion
50 head pipe
51 main frame
60 front fork
61 fuel tank
E engine

The invention claimed is:
1. A vehicle, comprising:
a pair of right and left main frames extending from a head pipe of a front portion of the vehicle to a rear direction of the vehicle;
an engine disposed below said main frames;
a fuel tank disposed above said main frames;
an air cleaner disposed above said engine and adjacent to said fuel tank;
wherein the air cleaner is disposed in a front direction side of said fuel tank, and a part of the air cleaner is disposed in a lower direction side of the fuel tank, and wherein an inner side portion of the air cleaner disposed between said pair of right and left main frames and an outer side portion of the air cleaner disposed so as to bulge to an outer side in a width direction of the vehicle of said pair of right and left main frames, are connected,
wherein the outer side portion is configured such that a forefront portion in a front direction side of the vehicle comprises a convex bulge facing forwardly and positioned forward of said inner side portion and bulges to a further forward direction side of the vehicle relative to said inner side portion, and wherein the outer side portion is one of a pair of right and left outer side portions.

2. The vehicle according to claim 1, wherein a pair of recessed portions recessed to the rear direction of the vehicle are adjacently formed in the right and left direction of the vehicle on a front end portion of the air cleaner in an upper view of the vehicle, and wherein said recessed portions are disposed so as to face to a front fork holding a front wheel of the vehicle.

3. The vehicle according to claim 1, wherein at least one of the pair of right and left outer side portions houses an air cleaner element,
and wherein an intake opening is provided on an outer side wall portion in the outer side in the width direction of the vehicle of the outer side portion housing said air cleaner element.

4. The vehicle according to claim 3, wherein the intake opening is opened to the lower direction and the front direction of the vehicle.

5. The vehicle according to claim 3, wherein said outer side wall portion of said outer side portion housing said air cleaner element is provided so as to be openable and closable.

6. The vehicle according to claim 1, further comprising an intake pipe configured to send intake air from said air cleaner to a throttle body, the intake pipe having an inside inserting tube portion extending to an inner direction of said inner side portion.

7. A vehicle according to claim 1, wherein said vehicle comprises a straddle-type vehicle.

8. A vehicle, comprising:
a pair of right and left main frames extending from a head pipe of a front portion of the vehicle to a rear direction of the vehicle;
an engine disposed below said main frames;
a fuel tank disposed above said main frames; and
an air cleaner disposed above said engine and adjacent to said fuel tank;
wherein the air cleaner is disposed in a front direction side of said fuel tank, and a part of the air cleaner is disposed in a lower direction side of the fuel tank, and wherein an inner side portion of the air cleaner disposed between said pair of right and left main frames and an outer side portion of the air cleaner disposed so as to bulge to an outer side in a width direction of the vehicle of said pair of right and left main frames, are connected,
wherein the outer side portion is one of a pair of right and left outer side portions,
wherein at least one of the pair of right and left outer side portions houses an air cleaner element,
wherein an intake opening is provided on an outer side wall portion in the outer side in the width direction of the vehicle of the outer side portion housing said air cleaner element,
wherein said outer side wall portion of said outer side portion housing said air cleaner element is provided so as to be openable and closable,
wherein the vehicle further comprises a cowl member configured to cover at least side directions of the outer side portions, and
wherein a cowl side portion facing to the outer side wall portion of said outer side portion housing the air cleaner element is provided so as to be openable and closable on the cowl member.

9. A vehicle, comprising:
main frame means for supporting vehicle components thereupon, said main frame means extending from a head pipe in a front of the vehicle to a rear direction of the vehicle;
engine means disposed below said main frame means, said engine means for providing motive power;
fuel tank means disposed above said main frame means, said fuel tank means for storing fuel therein;
air cleaner means disposed above said engine means and adjacent said fuel tank means, said air cleaner means for cleaning intake air to the engine means,
wherein the air cleaner means is disposed in a front direction side of the fuel tank means, and a part of the air cleaner means is disposed in a lower direction side of the fuel tank means, and wherein an inner side portion of the air cleaner means disposed between the main frame means and an outer side portion of the air cleaner means disposed so as to bulge to an outer side in a width direction of the vehicle of the main frame means, are connected,
wherein the outer side portion is configured such that a forefront portion in a front direction side of the vehicle comprises a convex bulge facing forwardly and positioned forward of said inner side portion and bulges to a further forward direction side of the vehicle relative to said inner side portion, and
wherein the outer side portion is one of a pair of right and left outer side portions.

10. The vehicle according to claim 9, wherein a pair of recessed portions recessed to the rear direction of the vehicle are adjacently formed in the right and left direction of the vehicle on a front end portion of the air cleaner means in an upper view of the vehicle, and wherein said recessed portions are disposed so as to face to a front fork holding a front wheel of the vehicle.

11. The vehicle according to claim 9, wherein at least one of the pair of right and left outer side portions houses an air cleaner element means,
and wherein intake opening means are provided on an outer side wall portion in the outer side in the width direction of the vehicle of the outer side portion housing said air cleaner element means.

12. The vehicle according to claim 11, wherein the intake opening is opened to the lower direction and the front direction of the vehicle.

13. The vehicle according to claim 11, wherein said outer side wall portion of said outer side portion housing said air cleaner element means is provided so as to be openable and closable.

14. The vehicle according to claim 9, further comprising intake means for sending intake air from the air clear means to a throttle body means for throttling the intake air, the intake type means having an inside inserting tube portion extending to an inner direction of said inner side portion.

15. The vehicle according to claim 9, wherein the vehicle comprises a straddle-type vehicle.

16. A vehicle, comprising:
main frame means for supporting vehicle components thereupon, said main frame means extending from a head pipe in a front of the vehicle to a rear direction of the vehicle;
engine means disposed below said main frame means, said engine means for providing motive power;
fuel tank means disposed above said main frame means, said fuel tank means for storing fuel therein; and air cleaner means disposed above said engine means and adjacent said fuel tank means, said air cleaner means for cleaning intake air to the engine means;

wherein the air cleaner means is disposed in a front direction side of the fuel tank means, and a part of the air cleaner means is disposed in a lower direction side of the fuel tank means, and wherein an inner side portion of the air cleaner means disposed between the main frame means and an outer side portion of the air cleaner means disposed so as to bulge to an outer side in a width direction of the vehicle of the main frame means, are connected, wherein the outer side portion is one of a pair of right and left outer side portions, wherein at least one of the pair of right and left outer side portions houses an air cleaner element means, wherein intake opening means are provided on an outer side wall portion in the outer side in the width direction of the vehicle of the outer side portion housing said air cleaner element means, wherein said outer side wall portion of said outer side portion housing said air cleaner element means is provided so as to be openable and closable, wherein the vehicle further comprises cowl means for covering at least side directions of the outer side portions, and wherein a cowl side portion facing to the outer side wall portion of said outer side portion housing the air cleaner element means is provided so as to be openable and closable on the cowl means.

* * * * *